(12) United States Patent
Imai

(10) Patent No.: US 12,008,422 B2
(45) Date of Patent: Jun. 11, 2024

(54) IMAGE FORMING APPARATUS, IMAGE FORMING METHOD, AND STORAGE MEDIUM

(71) Applicant: CANON KABUSHIKI KAISHA, Tokyo (JP)

(72) Inventor: Seijiro Imai, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/969,788

(22) Filed: Oct. 20, 2022

(65) Prior Publication Data
US 2023/0131875 A1   Apr. 27, 2023

(30) Foreign Application Priority Data
Oct. 27, 2021   (JP) ................. 2021-175379

(51) Int. Cl.
G06K 15/02 (2006.01)
G03G 15/08 (2006.01)
G06K 15/14 (2006.01)

(52) U.S. Cl.
CPC ..... G06K 15/1878 (2013.01); G03G 15/0863 (2013.01); G06K 15/14 (2013.01); *G03G 2215/0697* (2013.01)

(58) Field of Classification Search
CPC ............... G06K 15/1878; G06K 15/14; G03G 15/0863; G03G 2215/0697
USPC ......................................... 358/1.1, 1.9, 1.15
See application file for complete search history.

(56) References Cited

U.S. PATENT DOCUMENTS

| 6,888,645 B1 * | 5/2005 | Fujimoto | H04N 1/00867 |
| | | | 358/1.9 |
| 2012/0050766 A1 * | 3/2012 | Saiki | H04N 1/6027 |
| | | | 358/1.9 |
| 2013/0155427 A1 * | 6/2013 | Ichihashi | H04N 1/6033 |
| | | | 358/1.9 |
| 2019/0377281 A1 * | 12/2019 | Itou | G03G 15/0849 |
| 2021/0240103 A1 * | 8/2021 | Kyotani | G03G 21/1875 |

FOREIGN PATENT DOCUMENTS

JP   2010-134060 A   6/2010

* cited by examiner

*Primary Examiner* — Quang N Vo
(74) *Attorney, Agent, or Firm* — Venable LLP

(57) ABSTRACT

An image forming apparatus is configured to obtain information indicating the capacity of a toner container. In accordance with the obtained information, a gamma table for correcting the luminance value of a printing-target image is determined and the luminance value of the image is corrected by using the determined gamma table.

9 Claims, 8 Drawing Sheets

IMAGE FORMING APPARATUS, IMAGE FORMING METHOD, AND STORAGE MEDIUM

BACKGROUND OF THE INVENTION

Field of the Invention

The present disclosure relates to an image forming apparatus, an image forming method, and a storage medium.

Description of the Related Art

As a laser beam image forming apparatus, there is an apparatus in which it is possible to exchange a cartridge as a whole with another, the cartridge integrating consumables, such as toner, a toner container storing toner, a developing unit, and a photosensitive drum, into one unit. As cartridges, a plurality of types of cartridge exists in accordance with the use thereof, such as a cartridge having a small-capacity toner container, one having a medium-capacity toner container, and one having a large-capacity toner container, for one type of image forming apparatus main body. In a case of a large-capacity toner container, from the viewpoint of the cartridge's life, as a photosensitive drum that is integrated in the cartridge, it is necessary to use one whose film is thick so as to be capable of undergoing long-term abrasion. In a case where the film of the photosensitive drum is thick, the way the electric potential on the photosensitive drum surface attenuates at the time of laser beam irradiation differs from that of one whose film is normal, and therefore, a difference arises in the amount of toner that sticks per dot. In a case where a difference in the amount of toner that sticks arises as described above, the density of a color that can be reproduced by the same number of dots differs, and therefore, a variation occurs in reproducibility of the intermediate density (halftone). Further, a photosensitive drum whose film thickness is different is used in accordance with the capacity of the toner container, and therefore, the variation in reproducibility of the intermediate density occurs also in a case of the small-capacity toner container and the medium-capacity toner container, not limited to the large-capacity toner container.

As regards the density adjustment of color for each cartridge, Japanese Patent Laid-open No. 2010-134060 has disclosed a technique as follows. That is, Japanese Patent Laid-open No. 2010-134060 has disclosed a technique to adjust the amount of toner sticking to a toner image to be formed on a photosensitive drum in accordance with information on the coloring degree (parameter) of the toner stored in the toner container, which is read from the ID chip installed in the toner container.

SUMMARY OF THE INVENTION

The technique disclosed in Japanese Patent Laid-open No. 2010-134060 premises that the color of the stored toner is different for each toner container. Because of this, in a case where the color of the toner is the same for each toner container and the capacity of the toner container is different, only the information indicating the coloring degree corresponding to each toner color can be referred to, and therefore, it is not possible to appropriately adjust the tint of an image used in printing processing.

The present disclosure has been made in view of the above-described problem and provides a technique to appropriately adjust the tint of an image in accordance with the capacity of a toner container.

The image forming apparatus according to one aspect of the present disclosure has a controller configured to: obtain information indicating a capacity of a toner container; determine a gamma table for correcting a luminance value of a printing-target image in accordance with the obtained information; and correct the luminance value of the image by using the determined gamma table.

Further features of the present invention will become apparent from the following description of exemplary embodiments with reference to the attached drawings.

DESCRIPTION OF THE EMBODIMENTS

In the following, aspects for embodying the present disclosure are explained by using the drawings. The following embodiments are not intended to limit the present disclosure and all combinations of features explained in the embodiments are not necessarily indispensable to the solution for solving the problem.

First Embodiment

<Configuration of Laser Beam Printer>

Figure 1:
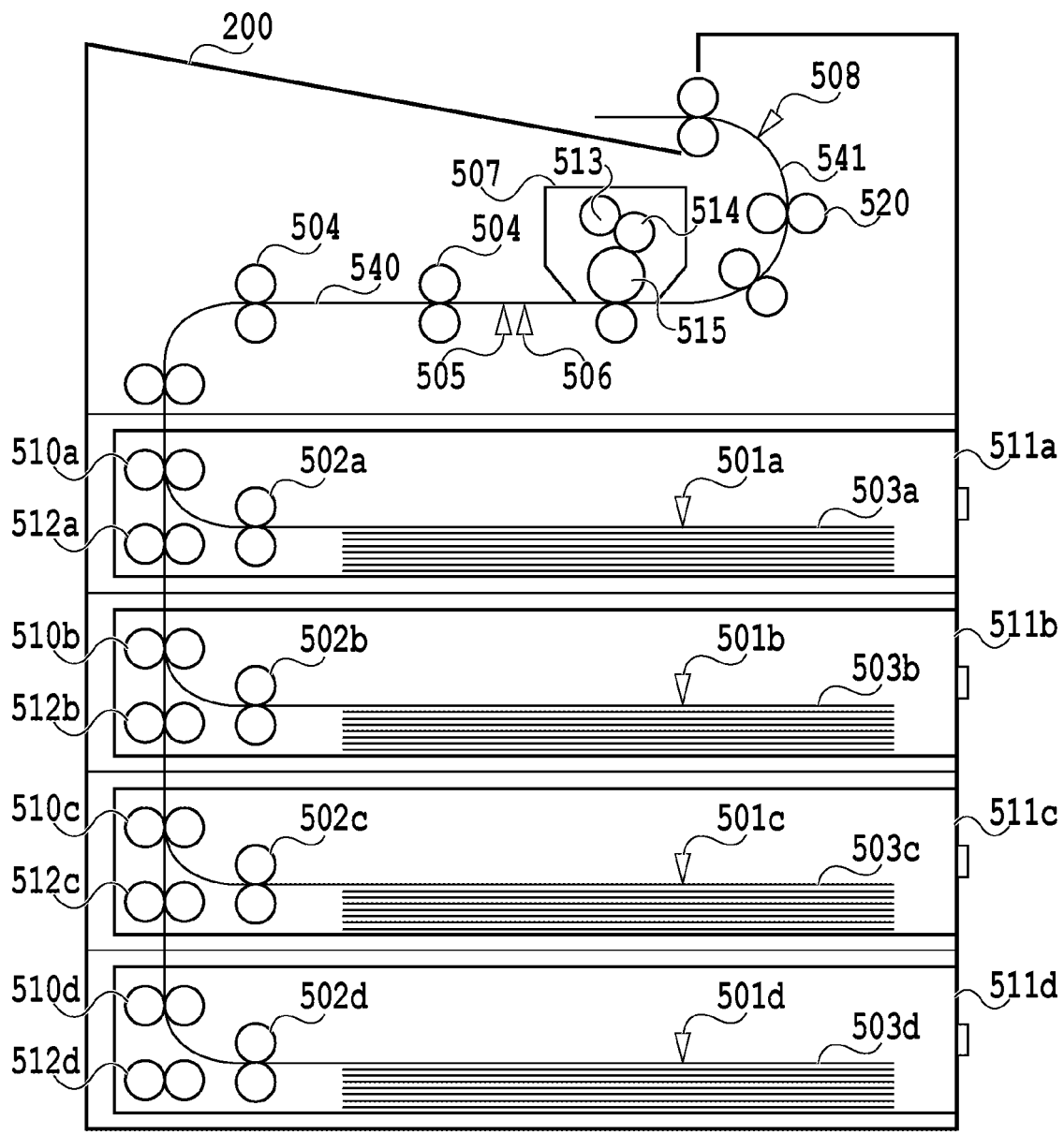
FIG. 1 is a cross-sectional diagram of a printing apparatus.

The configuration of a laser beam printer, which is an example of the printing apparatus according to the present embodiment, is explained with reference to the drawings. FIG. 1 is a cross-sectional diagram of the printing apparatus.

A printer 200 has sheet feed cassettes 511a to 511d, an image forming unit 507, a main conveyance path 540, and a discharge conveyance path 541. Further, in order to convey a printing material (sheet) on each conveyance path, the printer 200 has a plurality of rollers, for example, such as feeding rollers 502a to 502d, conveyance rollers 510a to 510d, 512a to 512d, a registration roller 504, and a discharge roller 520. Furthermore, the printer 200 has a plurality of sensors for detecting a printing material within the apparatus, for example, such as sheet presence/absence sensors 501a to 501d of the sheet feed cassettes, a registration sensor 505, a sheet detection sensor 506, and a discharge sensor 508. In the following, for simplification of explanation, postscript letters a, b, c, and d attached to each of the sheet feed cassettes 511a to 511d and to the reference symbol of each component included therein are omitted in description. It is assumed that in a case where the letters a, b, c, and d are omitted from the reference symbol, the reference symbol indicates all the sheet feed cassettes or components.

The sheet feed cassette 511 functions as a feeding unit and supplies a printing material on which an image is formed into the apparatus. The printing material is a printing medium, such as a paper sheet, a sheet, and a thick sheet, on which an image or the like is formed.

The image forming unit 507 includes an exposing unit (not shown schematically), a toner container 513, a developing unit 514, and a photosensitive drum 515, which is an image bearing member, for forming an image on a printing material. The image forming unit 507 is comprised of a cartridge in which the exposing unit, the toner container 513, the developing unit 514, and the photosensitive drum 515 are provided integrally and in which these components are packed together. The image forming unit 507 forms an electrostatic latent image on the photosensitive drum (image bearing member) 515 through exposure by the exposing unit. This electrostatic latent image is formed in accordance with image data received by a controller 210, to be described later. The formed electrostatic latent image is developed by the developing unit 514 with toner (developer) supplied from the toner container 513 and transferred onto a printing material at a predetermined transfer position. The toner image formed on the printing material is fixed by a fixing unit (not shown schematically) applying heat and pressure. The cartridge in which consumables, such as the exposing unit, the toner container 513, the developing unit 514, and the photosensitive drum 515, are provided integrally is easy to handle and does not require a service person for cartridge exchange work, and there is such an advantage that it is possible to exchange the cartridge with another by a user him/herself.

The main conveyance path 540 is a conveyance path that is arranged between the feeding roller 502 and the discharge roller 520 and which forms an image on a printing material. The conveyance roller 510 exists as part of the sheet feed cassette 511. Consequently, in the state where the sheet feed cassette 511 is drawn out, the sheet conveyance path from the lower sheet feed cassette 511 is cut off, and therefore, it is not possible to supply a printing material to the printer and printing will fail. The discharge conveyance path 541 is a conveyance path that is arranged between the discharge roller 520 and the outside of the printer 200 and which discharges a printing material to the outside of the apparatus.

The feeding roller 502 conveys the printing material placed in the sheet feed cassette 511 into the apparatus one by one. The conveyance roller 510 is a roller that pulls up the printing material that is fed from each sheet feed cassette 511 up to the printer. Further, the registration roller 504 is a roller that adjusts timing of transferring an image onto the printing material that is conveyed in the image forming unit 507. The discharge roller 520 is a roller for discharging a printing material to the outside of the apparatus.

The sheet presence/absence sensor 501 is a sensor that detects the presence/absence of a printing material that is placed in the sheet feed cassette 511. The registration sensor 505, the sheet detection sensor 506, and the discharge sensor 508 detect a printing material that is conveyed. These sensors may be a mechanically configured switch or an optically configured sensor. The registration sensor 505 is used for adjusting the transfer timing of a printing material that is conveyed and a toner image that is formed on the photosensitive drum 515. Further, the registration sensor 505 is also used for measuring the length of a printing material in the sub scanning direction. It is possible to find the length of a printing material in the sub scanning direction from the time during which the registration sensor 505 detects the conveyed printing material and the conveyance speed of the printing material. The sheet detection sensor 506 detects the presence/absence of a printing material at both end portions of the main conveyance path 540 and is used for finding the length of the printing material in the main scanning direction from the detection results. Further, in the present embodiment, the printer 200 does not have a density sensor and does not comprise a mechanism to read the density of a patch formed in the shape of an ITB belt.

<Printer Control System>

Figure 2:
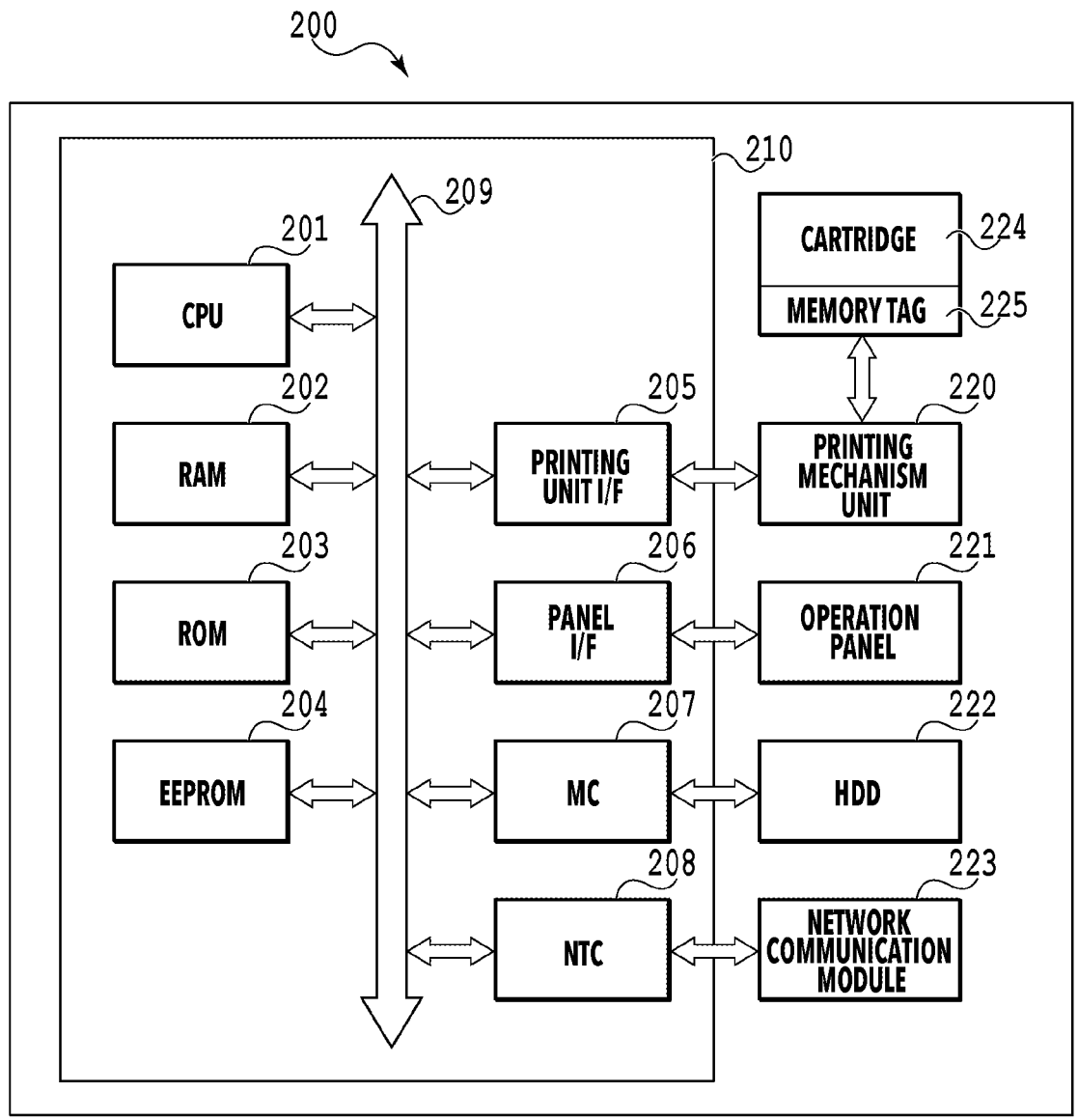
FIG. 2 is a block diagram showing a hardware configuration example of the printing apparatus.

The printer control system is explained with reference to the drawing. FIG. 2 is a block diagram showing a hardware configuration example of the control system of the printing apparatus. Here, explanation is given by taking the laser beam printer shown in FIG. 1 as an example.

As shown in FIG. 2, the printer 200 has the controller 210, a printing mechanism unit 220, an operation panel 221, an HDD (hard disk) 222, and a network communication module 223. It is made possible for the printer 200 to mount (insert) a cartridge 224 provided with a memory tag 225. The controller 210 has a CPU 201, a RAM 202, a ROM 203, an EEPROM 204, a printing unit I/F 205, a panel I/F 206, an MC (memory controller) 207, and an NTC (network controller) 208. These components are connected by a system bus 209.

The CPU 201 is a printer CPU and comprehensively controls the access with various devices connected to the system bus 209 based on control programs and the like stored in a program ROM of the ROM 203. Further, the CPU 201 outputs an image signal as output information to the printing mechanism unit 220 connected via the printing unit I/F (interface) 205. Here, it is possible for the printing mechanism unit 220 to access the memory tag 225 provided in the cartridge 224. Consequently, it is also possible for the controller 210 to access the memory tag 225 via the printing mechanism unit 220. Because of this, it is possible for the printer 200 to obtain information for identifying the cartridge by accessing the memory tag 225. Further, the printing mechanism unit 220 comprises a remaining amount detection sensor for detecting the toner remaining amount of the cartridge 224. The printing mechanism unit 220 calculates the toner remaining amount by using the remaining amount value read by the remaining amount detection sensor and the dot count of a printed image.

Figure 6:
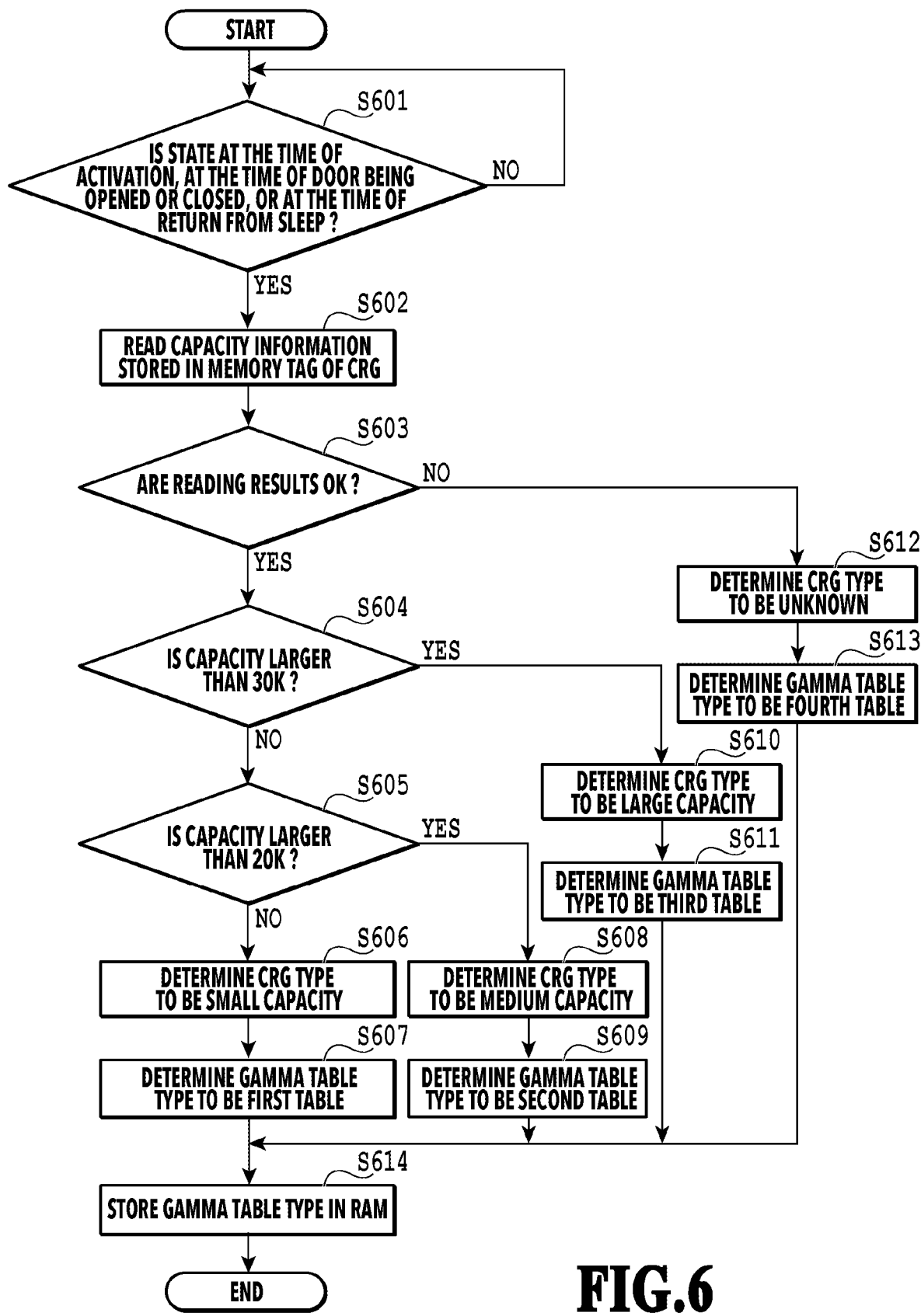
FIG. 6 is a flowchart showing a flow of gamma table switching processing.
Figure 7:
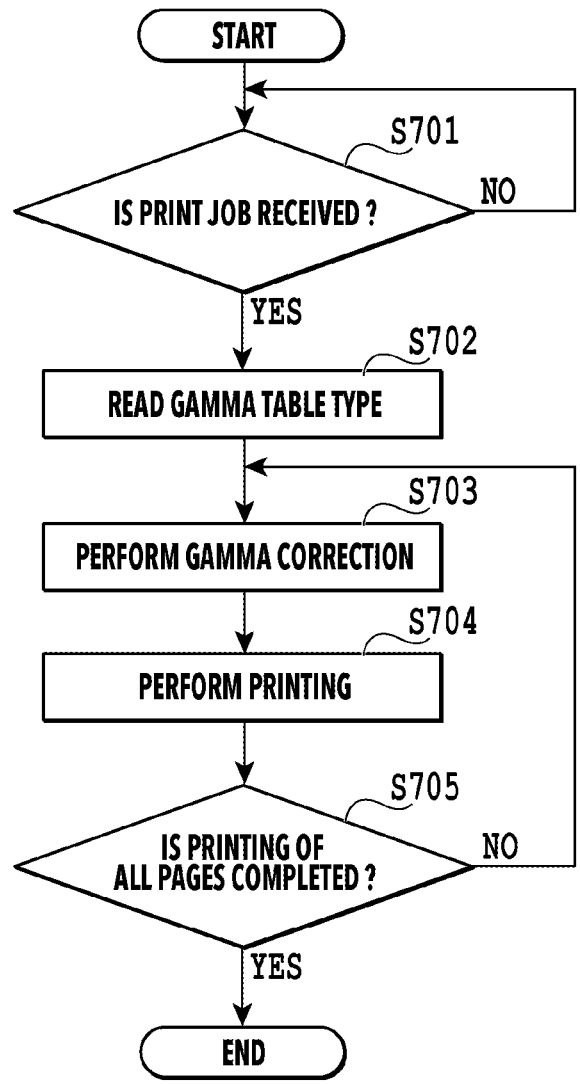
FIG. 7 is a flowchart showing a flow of processing at the time of print job reception.

The program ROM of the ROM (Read Only Memory) 203 stores the control program and the like of the CPU 201 for performing such processing as shown in the flowcharts in FIG. 6 and FIG. 7.

The RAM (Random Access Memory) 202 is a storage medium that functions as a main memory, a work area and the like of the CPU 201 and configured so as to be capable of extending the memory capacity by an optional RAM connected to an extension port (not shown schematically). The RAM 202 is used as a drawing memory for storing image data received from a host computer, a video signal ON/OFF information storage area, other work areas and the like. The EEPROM (Electrically Erasable Programmable Read-Only Memory) 204 is a nonvolatile memory device and stores setting values of various functions, which are set on the operation panel 221, and the like. The EEPROM 204 is not limited to this as long as it is a nonvolatile memory and may be configured by a nonvolatile memory, such as a Flash ROM and eMMC (embedded Multi Media Card).

On the operation panel 221, switches for operations, LED displays and the like are arranged and it is possible to control the operation panel 221 by the CPU 201 via the panel I/F 206. Then, the MC 207 controls the access with the HDD 222 storing print data and the like received from the host computer. The NTC 208 controls the network communication module 223 and is capable of communicating with a variety of host computers and devices on the network.

<Control Configuration of Printing System>

Figure 3:
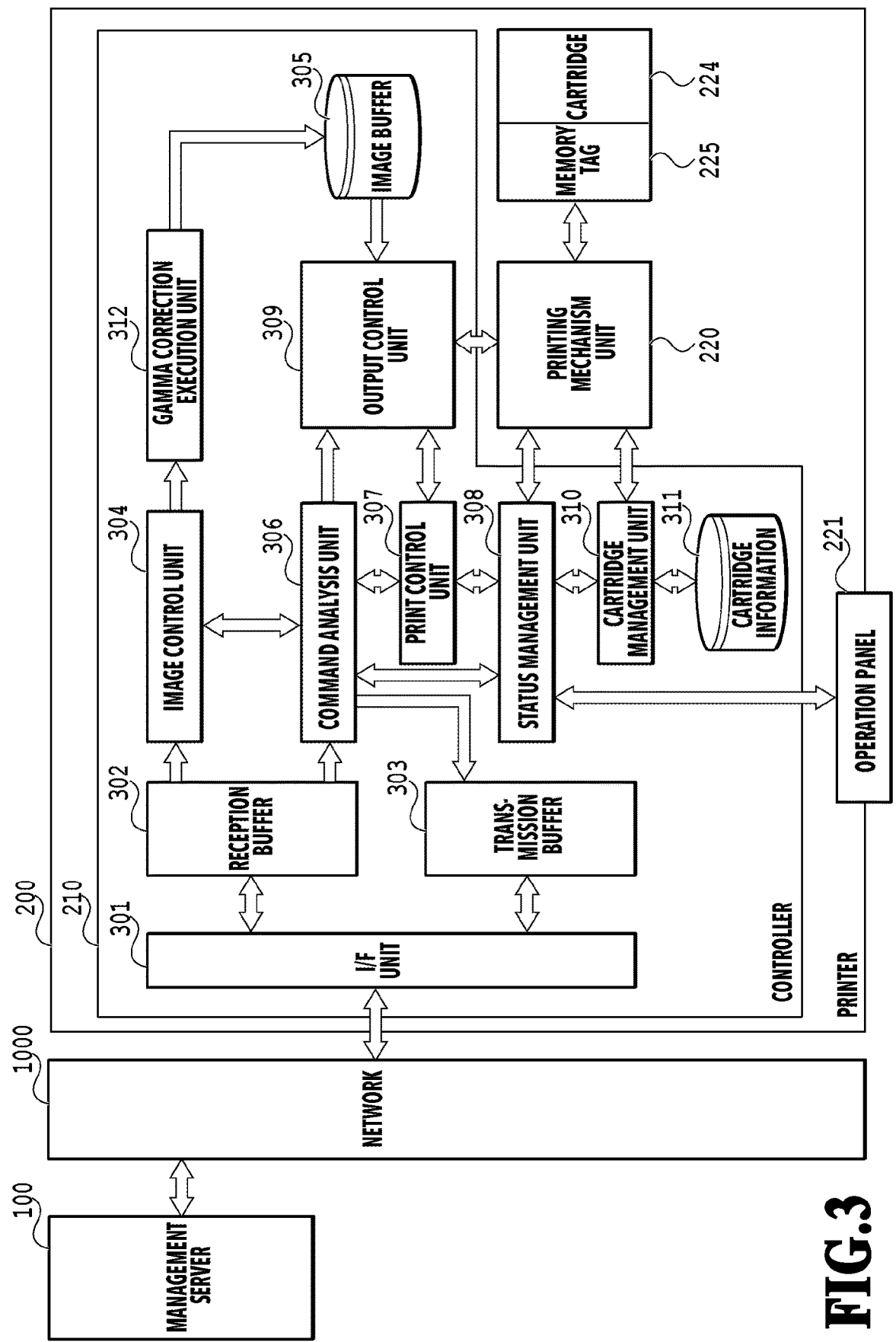
FIG. 3 is a block diagram showing a control configuration example of a printing system.

Next, with reference to the drawing, the control configuration of the printing system including the printer 200 is explained. FIG. 3 is a block diagram showing a control configuration example of the printing system. FIG. 3 shows a processing configuration example for performing management of the cartridge in the CPU 201 of the printer 200. In FIG. 3, a management server 100 is a host computer that functions as a management server of the printing apparatus and performs management by receiving information on the cartridge 224 attached to the printing apparatus of each user via a network 1000, such as the internet.

The printer 200 has the controller 210, the operation panel 221, the printing mechanism unit 220, and the cartridge 224 in a case where the printer is divided in terms of function. In the present embodiment, as the printer 200, specifically, a laser beam printer (in the following, described as LBP) is supposed. The printer to which the present disclosure is applicable is not limited to the LBP and may be a printer adopting another method, such as an ink jet printer and a thermal (thermal transfer) printer.

In the printer 200, the controller 210 has an I/F (interface) unit 301 configured to connect with the management server 100. The controller 210 further has a reception buffer 302 for temporarily storing and managing received data and the like and a transmission buffer 303 for temporarily storing and managing data to be transmitted and the like. Furthermore, the controller 210 also has a command analysis unit 306 configured to govern analysis of print data, a print control unit 307, an image control unit 304, a gamma correction execution unit 312, an output control unit 309, a status management unit 308, a cartridge management unit 310 and the like.

The I/F unit 301 performs transmission and reception of print data with the management server 100. The print data received through the I/F unit 301 is sequentially accumulated in the reception buffer 302 that temporarily stores the data and read and processed by the command analysis unit 306 or the image control unit 304 as needed. The command analysis unit 306 includes control programs in conformity with each print control command system and the print job control language. In a case where the command that is analyzed by the command analysis unit 306 is related to image data, such as bitmap data, instructions are given to the image control unit 304 and the command is processed. Further, in a case where the command is related to image data in accordance with the cartridge 224 currently inserted, instructions are given to the gamma correction execution unit 312 and gamma correction processing is performed. In a case where the command is related to a command, such as sheet feed selection and reset command, other than drawing, instructions are given to the print control unit 307 and the command is processed.

In the image control unit 304, the command portion is removed from the transferred image data command data and in a case where the data is compressed image data, decompression processing is performed by the image control unit 304 and the data is sent to the gamma correction execution unit 312. In the gamma correction execution unit 312, gamma correction processing is performed for the image data (RGB signal) by referring to the gamma table in accordance with the inserted cartridge and the image data for which gamma correction has been performed is stored in an image buffer 305. The image buffer 305 may be managed by the catch and run control of the image data reception processing and the output of the video signal to the printing mechanism unit (printer engine) 220, that is, the banding control. Alternatively, in a case where there is an ample memory capacity, it may also be possible to secure an area capable of storing data corresponding to one page as the image buffer 305.

The status management unit 308 has a function to determine various states of the printer based on information from the print control unit 307 and cause the state of the printer to be displayed on the operation panel 221. Further, the status management unit 308 has a function to return the state of the printer in response to the status information obtaining command issued from the management server 100. The cartridge management unit 310 has a function to access the memory tag 225 of the cartridge 224 via the printing mechanism unit 220 and detect the toner's life. The cartridge management unit 310 further has a function to determine whether the cartridge 224 is a genuine item or a recycled item.

The output control unit 309 converts the image bitmap data, which is the image data stored in the image buffer 305 and for which gamma correction has been performed, into a CMYK signal and transfers the signal to the printing mechanism unit (printer engine) 220 as a video signal. The printing mechanism unit 220 is a mechanism for forming a permanent visual image of the received video signal on a printing medium.

<Data of Memory Tag>

Figure 4:
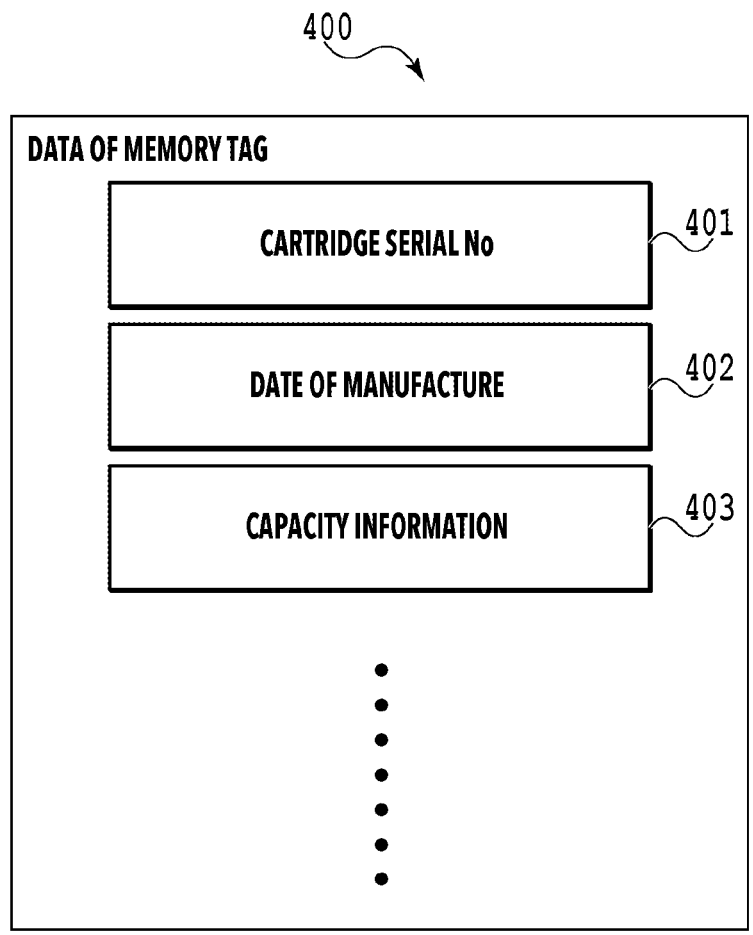
FIG. 4 is a diagram showing a data configuration example of a memory tag.

A configuration example of data stored in the memory tag is explained by using the drawing. FIG. 4 is a diagram showing a configuration example of data stored in the memory tag 225. In the memory tag 225, a plurality of pieces of information is written, such as information for identifying (specifying) a cartridge before the cartridge arrives at a user, such as at the time of factory shipping. Data 400 of the memory tag includes a plurality of pieces of information, for example, such as information 401-403. The information 401 is information that is not duplicated for a plurality of cartridges and which indicates an ID that is determined uniquely and indicates the serial number that is attached to each cartridge. The information 402 is information indicating the date of manufacture of the cartridge. The information 403 is information indicating the capacity of toner. In the present embodiment, the capacity information indicates the number of sheets on which the contents having a print rate of 3% can be printed in A4 size (210 mm×297 mm). That is, Capacity information 403 indicates how many pages can be printed from the state where the cartridge is new, in which the memory tag is provided, and does not indicate a value that changes each time printing is performed. The printer 200 reads Capacity information 403 from the memory tag and identifies the type of the cartridge currently inserted. The capacity information in the present embodiment is an example and the format of the capacity information is not limited to this as long as the information is capable of determining the capacity and type of a cartridge, such as weight information on the toner capacity at the time of shipping of the cartridge and an ID indicating the capacity and type of a cartridge. The information 401 to 403 is part of information written in the memory tag 225 and information other than the information 401 to 403 is also written in the memory tag 225.

<Relationship Between Cartridge Type and Gamma Table>

Figure 5:
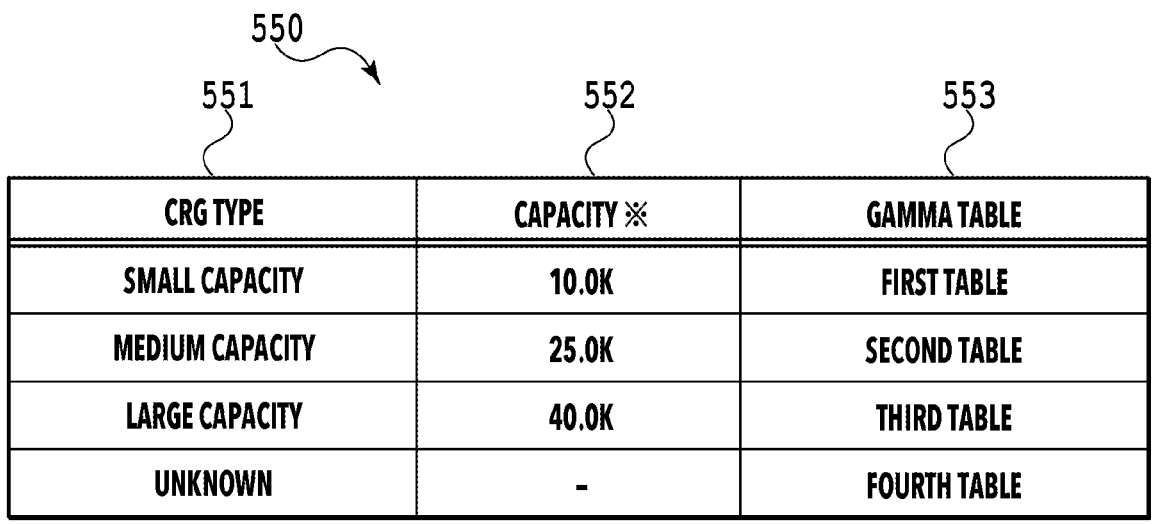
FIG. 5 is a diagram showing a relationship between cartridge types and gamma tables.

The relationship between cartridge type and gamma table is explained by using the drawing. FIG. 5 is a diagram showing the relationship between three types of cartridge and gamma tables. In the present embodiment, it is assumed that as the types of the cartridge 224 that are used in the printer 200, three types of the cartridge 224 exist, that is, the small-capacity cartridge 224, the medium-capacity cartridge 224, and the large-capacity cartridge 224 in accordance with the size (capacity) of the toner container 513 of the cartridge 224. The table shown in FIG. 5 is stored in the ROM 203.

A gamma correction table list 500 defines Capacity 552 and Gamma Table 553 corresponding to each other in association for each cartridge type (CRG Type) 551.

The cartridge type 551 indicates the capacity and type of the toner container of the cartridge and is divided into "Small capacity", "Medium capacity", "Large capacity", and "Unknown" (capacity is unknown).

Capacity 552 indicates the capacity of each cartridge, which corresponds to the capacity indicated by Capacity information 403 stored in the memory tag 225 provided in each cartridge. Capacity information 403 indicates the number of sheets on which the contents having a print rate of 3% can be printed in A4 size as described above. In a case where the cartridge type is "Small capacity", Capacity information 403 indicates that it is possible to print the above-described contents on 10K=10,000 sheets from the state where the cartridge is a new product.

Gamma Table 553 indicates four types of gamma table corresponding to each cartridge type. First to Third tables (first to third gamma tables) are each a lookup table (LUT) for performing conversion of input/output values in accordance with the input/output characteristics of each cartridge. Fourth table (fourth gamma table) is a lookup table (LUT) that is referred to for performing conversion of input/output values in a case where reading of the capacity information has not been performed normally and the cartridge type is unknown.

"Small capacity" of the cartridge type 551 is associated with the toner container 513 of the cartridge 224 whose size (capacity) is small. With "Small capacity", "10.0K" of Capacity 552 and "First table" (first gamma table) of Gamma Table 553 are associated. Consequently, in a case where it is determined that the cartridge type is Small capacity based on the capacity information read from the memory tag provided in the cartridge in the state where the cartridge of "Small capacity" is inserted, the gamma correction processing is performed by referring to First table.

"Medium capacity" of the cartridge type 551 is associated with the toner container 513 of the cartridge 224 whose size (capacity) is medium. With "Medium capacity", "25.0K" of Capacity 552 and "Second table" (second gamma table) of Gamma Table 553 are associated. Consequently, in a case where it is determined that the cartridge type is Medium capacity based on the capacity information read from the memory tag provided in the cartridge in the state where the cartridge of "Medium capacity" is inserted, the gamma correction processing is performed by referring to Second table.

"Large capacity" of the cartridge type 551 is associated with the toner container 513 of the cartridge 224 whose size (capacity) is large. With "Large capacity", "40.0K" of Capacity 552 and "Third table" (third gamma table) of Gamma Table 553 are associated. Consequently, in a case where it is determined that the cartridge type is Large capacity based on the capacity information read from the memory tag provided in the cartridge in the state where the cartridge of "Large capacity" is inserted, the gamma correction processing is performed by referring to Third table.

"Unknown" (capacity of toner container is unknown) of the cartridge type 551 is associated with a toner container in a case where it is not possible to read the capacity information normally for some reason, such as a failure of the memory tag 225. With "Unknown", "-" of Capacity 552 and "Fourth table" (fourth gamma table) of Gamma Table 553 are associated. Consequently, in a case where it is determined that the cartridge type is Unknown because it is not possible to read the capacity information normally from the memory tag provided in the cartridge in the state where one of the cartridges is inserted, the gamma correction processing is performed by referring to Fourth table.

The gamma table selection flow for each cartridge will be described later.

<Gamma Table Switching Processing>

Next, the method of switching gamma tables in accordance with the cartridge type of the cartridge inserted into (mounted on) the printer is explained by using the drawing. FIG. 6 is a flowchart showing a flow of gamma table switching (selecting) processing. This processing is implemented by the CPU 201 reading a control program stored in the ROM 203 onto the RAM 202 and executing the program. Further, it may also be possible to implement part or all of the functions at the steps in FIG. 6 by hardware, such as an ASIC and an electronic circuit. Symbol "S" in explanation of each piece of processing means that the step is a step in this flowchart and this also applies to subsequent flowcharts.

At S601, the printer 200 determines whether the state is at the time of activation, at the time of the door being opened or closed, or at the time of return from sleep. The determination of whether the state is at the time of activation is performed based on, for example, confirmation results of current status information on the printer 200. The determination of whether the state is at the time of the door being opened or closed is performed based on, for example, detection results of a door sensor or the like that detects opening/closing of the door. The determination of whether the state is at the time of return from sleep is performed based on, for example, confirmation results of current status information on the printer 200. In a case where it is determined that the state is at none of the time of activation, the time of the door being opened or closed, and the time of return from sleep (NO at S601), the printer 200 performs the processing at S601 again. In a case where it is determined that the state is at one of the time of activation, the time of the door being opened or closed, and the time of return from sleep (YES at S601), the processing is moved to S602. That is, the printer 200 keeps waiting until the state at one of the time of activation, the time of the door being opened or closed, and the time of return from sleep is brought about and in a case where the state at one of the time of activation, the time of the door being opened or closed, and the time of return from sleep is brought about, the processing is moved to S602.

At S602, the printer 200 accesses the memory tag 225 provided in the inserted cartridge 224 and reads Capacity information 403 from the memory tag 225. In a case where it is not possible to read the capacity information even after a predetermined time has elapsed from the start of the reading processing, the reading processing is performed again. In a case where it is not possible to read the capacity information even after performing the reading processing a predetermined number of times, the printer 200 obtains information indicating that the reading has not been performed normally and after the information is obtained, the processing is moved to S603.

At S603, the printer 200 checks the reading results of Capacity information 403 and determines whether the reading has been performed normally. In a case where the determination results that the reading has been performed normally are obtained (YES at S603), the processing is moved to S604.

At S604, the printer 200 determines whether or not the value of read Capacity information 403 is larger than 30K, which is a first threshold value. In a case where the determination results that the value of read Capacity information 403 is larger than 30K are obtained (YES at S604), the processing is moved to S610. At S610, the printer 200 determines the cartridge type to be Large capacity. Accompanying this, at S611 that follows the processing at S610, the printer 200 determines to select Third table (third gamma table) as the gamma table that is referred to at the time of gamma correction.

On the other hand, in a case where the determination results that the value of read Capacity information 403 is less than or equal to 30K are obtained (NO at S604), the processing is moved to S605.

At S605, the printer 200 determines whether or not the value of read Capacity information 403 is larger than 20K, which is a second threshold value. In a case where the determination results that the value of read Capacity information 403 is larger than 20K are obtained (YES at S605), the processing is moved to S608. At S608, the printer 200 determined the cartridge type to be Medium capacity. Accompanying this, at S609 that follows the processing at S608, the printer 200 determines to select Second table (second gamma table) as the gamma table that is referred to at the time of gamma correction.

On the other hand, in a case where the determination results that the value of read Capacity information 403 is less than or equal to 20K are obtained (NO at S605), the processing is moved to S606.

At S606, the printer 200 determines the cartridge type to be Small capacity. Accompanying this, at S607 that follows the processing at S606, the printer 200 determines to select First table (first gamma table) as the gamma table that is referred to at the time of gamma correction.

On the other hand, in a case where the determination results that the reading of the memory tag 225 has not been performed normally for some reason, such as a failure of the memory tag, at the time of reading of the capacity information on the memory tag 225 are obtained (NO at S603), the processing is moved to S612.

At S612, the printer 200 determines the type of the cartridge capacity to be Unknown. At S613 that follows the processing at S612, the printer 200 determines to select Fourth table (fourth gamma table) as the gamma table that is referred to at the time of gamma correction.

That is, in accordance with the obtained information, the cartridge type (the capacity of the toner container) is specified and the gamma table corresponding to the specification results and for correcting the luminance value of the printing-target image is determined.

Then, in one of the processing at S607, S609, S611, and S613 described above, a gamma table corresponding to the cartridge type is selected and then the processing is moved to S614.

At S614, the printer 200 stores the gamma table type selected in one of the processing at S607, S609, S611, and S613 in the RAM 202.

In the present embodiment, the determination of the cartridge capacity (S604, S605) is performed by a comparison with a certain threshold value using a sign of inequality, but it may also be possible perform a comparison with a value each piece of capacity information can take using a sign of equality.

<Processing at the Time of Print Job Reception>

A flow of processing at the time of print job reception is explained by using the drawing. FIG. 7 is a flowchart showing a flow of processing in a case where the printer 200 receives a print job. This processing is implemented by the CPU 201 reading a control program stored in the ROM 203 onto the RAM 202 and executing the program.

At S701, the printer 200 determines whether or not print job input from the management server 100, which is a host computer, has been received. In a case where the determination results that the print job has not been received are obtained (NO at S701), the processing at S701 is performed again. On the other hand, in a case where the determination results that the print job has been received are obtained (YES at S701), the processing is moved to S702. That is, the printer 200 keeps waiting for the input of a print job from the management server 100 and in a case where the printer 200 receives a print job, the processing is moved to S702.

At S702, the printer 200 reads and obtains the gamma table type stored in the RAM 202 in the processing at S614 described above from the RAM 202.

At S703, the gamma correction execution unit 312 refers to the gamma table relevant to (associated with) the gamma table type read at S702 and performs gamma correction for the received image data. That is, the gamma correction execution unit 312 adjusts the tint of the image by correcting the luminance value of the printing-target image by using the gamma table. At S704, the printer 200 performs printing for the conveyed printing medium based on the image data for which gamma correction has been performed. That is, the printer 200 forms an image on the printing medium based on the output video signal obtained by converting the image data (RGB signal) for which gamma correction has been performed into a CMYK signal.

At S705, the printer 200 determines whether or not printing is completed for all the pages of the received print job. In a case where the determination results that printing for all the pages is not completed are obtained (NO at S705), the processing is moved to S703 and the processing at S703 and subsequent steps is performed for the unprocessed page image data. On the other hand, in a case where the determination results that printing for all the pages is completed are obtained (YES at S705), the flow shown in FIG. 7 is terminated. That is, the printer 200 checks whether printing for all the pages of the received print job is completed and in a case where printing for all the pages of the received print job is completed, the processing is completed.

<Gamma Table>

Figure 8:
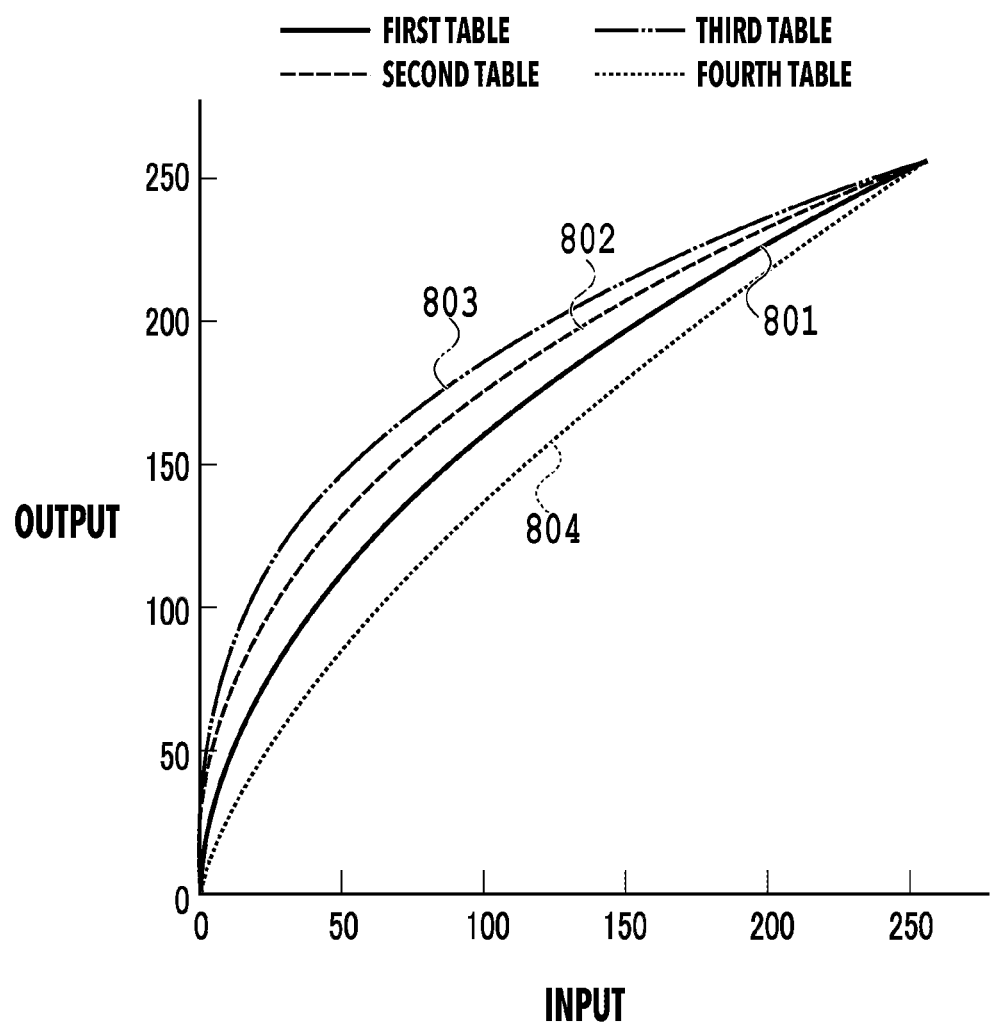
FIG. 8 is a diagram showing gamma table examples.

FIG. 8 is a diagram showing each gamma table example that is referred to in the present embodiment. The gamma table is a lookup table for converting the luminance value of a correction-target RGB image.

A first table 801, a second table 802, a third table 803, and a fourth table 804 each show a conversion curve and correspond to First table, Second table, Third table, and Fourth table in FIG. 5, respectively. The horizontal axis of the table represents the correction-target input luminance value (0 to 255) and the vertical axis represents the output luminance value (0 to 255), which is the converted (corrected) value. At the time of performing gamma correction, conversion is performed into the luminance value on the gamma table for each pixel of the correction-target image.

In the present embodiment, a longer-life cartridge having the large capacity of toner that is packed together has a thicker film of the photosensitive drum that is packed together. The thicker the film of the photosensitive drum, the smaller the attenuation of the electrical potential for the same quantity of light is, and therefore, the diameter of one dot that sticks to the photosensitive drum becomes small and as a result, the density of the halftone becomes low. That is, the luminance value becomes small with respect to the ideal value. The gamma tables shown in FIG. 8 are each a table that converts the halftone input into a high luminance value and because of the above-described background, the thicker the film of the photosensitive drum that is packed together with the cartridge, the higher the output luminance value into which the input luminance value is converted by the curve of the gamma table.

As explained above, according to the present embodiment, the capacity of the inserted cartridge is determined at the time of activation, at the time of the door being opened or closed, and at the time of return from sleep and gamma correction is performed by referring to the gamma table in accordance with the capacity. Because of this, it is possible to perform gamma correction with the optimum gamma table for each cartridge. For example, even in a case where the printer 200 has a configuration without a detection sensor that detects the density of toner applied onto a transfer belt or a scanner, it is possible to obtain the effect shown below. That is, it is possible to appropriately adjust the tint of an image by correcting the luminance value of a printing-target image by using the gamma table associated with the cartridge type of the cartridge currently inserted.

Other Embodiments

In the above, the example is explained in which the cartridge in which the exposing unit, the toner container, the developing unit, and the photosensitive drum are integrated into one unit is taken as a replacement part. It may also be possible to apply the present disclosure to an image forming apparatus in which each of the exposing unit, the toner container, the developing unit, and the photosensitive drum is exchanged.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiment, it is possible to appropriately adjust the tint of an image in accordance with the capacity of a toner container.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-175379, filed Oct. 27, 2021, which is hereby incorporated by reference herein in its entirety.

What is claimed is:

1. An image forming apparatus comprising:
a controller configured to:
obtain information regarding a capacity of a toner container set in the image forming apparatus;
determine, based on the obtained information, a gamma table for correcting a luminance value of an image; and
correct the luminance value of the image by using the determined gamma table.

2. The image forming apparatus according to claim 1, wherein
the image forming apparatus is capable of mounting a cartridge in which the toner container and an image bearing member on which toner stored in the toner container is borne are provided integrally,
the cartridge comprises a memory storing the information regarding the capacity of the toner container, and
the controller is configured to read and obtain the information regarding the capacity of the toner container from the memory of the cartridge.

3. The image forming apparatus according to claim 1, wherein
the toner container is one of a plurality of types of toner container classified by the capacity of the toner container,
the gamma table is determined from among a plurality of types of gamma tables, each associated with one of the plurality of types of the toner container, and
the controller is configured to specify the capacity of the toner container based on the obtained information and determine the gamma table corresponding to specified results.

4. The image forming apparatus according to claim 1, wherein
the gamma table can be associated with the toner container whose capacity is unknown, and
in a case where it is not possible for the controller to obtain the information, the controller is configured to determine the gamma table associated with the toner container whose capacity is unknown.

5. The image forming apparatus according to claim 1, wherein
the controller is further configured to form an image on a printing medium based on the image whose luminance value has been corrected.

6. The image forming apparatus according to claim 1, wherein
the information regarding the capacity of the toner container is information indicating a type of the toner container.

7. The image forming apparatus according to claim 1, wherein
the information regarding the capacity of the toner container is information regarding the number of sheets on which contents can be printed by using the toner container.

8. An image forming method comprising:
- an obtaining step of obtaining information regarding a capacity of a toner container set in an image forming apparatus;
- a determination step of determining, based on the obtained information, a gamma table for correcting a luminance value of an image; and
- a correction step of correcting the luminance value of the image by using the determined gamma table.

9. A non-transitory computer readable storage medium storing a program for causing a computer to perform an image forming method, the method comprising:
- an obtaining step of obtaining information regarding a capacity of a toner container set in an image forming apparatus;
- a determination step of determining, based on the obtained information, a gamma table for correcting a luminance value of an image; and
- a correction step of correcting the luminance value of the image by using the determined gamma table.

* * * * *